April 7, 1964
R. E. ESHELMAN
3,127,703
ADJUSTABLE GUIDE STRIPS OR GROUND MEMBERS
Filed May 24, 1962
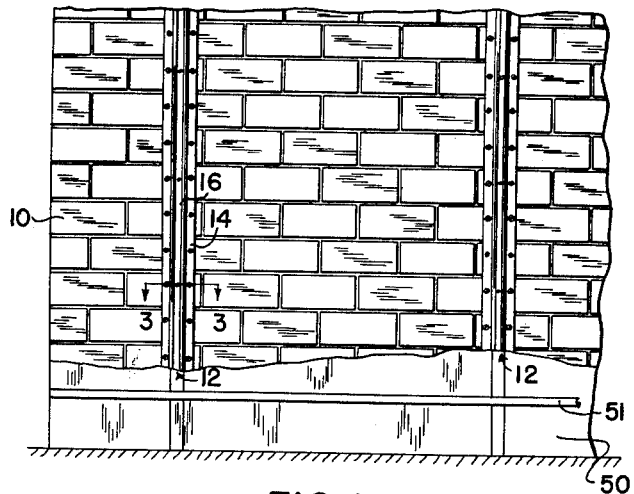
FIG. 1
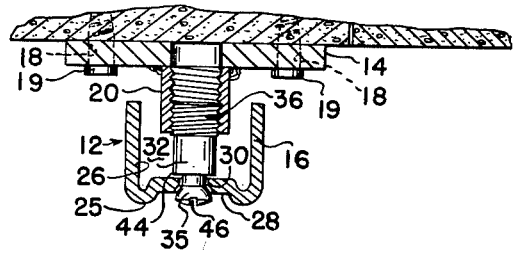
FIG. 3
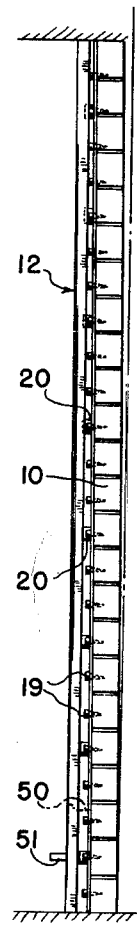
FIG. 2
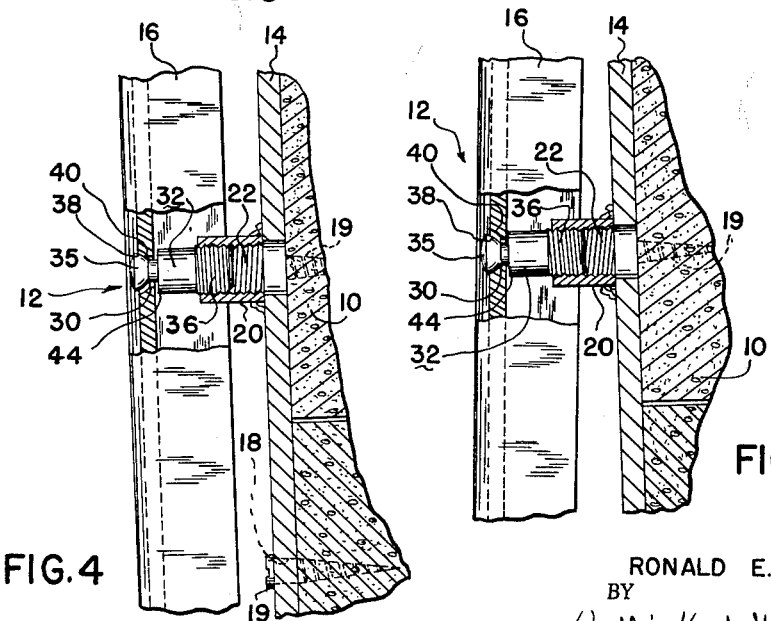
FIG. 4
FIG. 5
INVENTOR.
RONALD E. ESHELMAN
BY
Woodling, Krost, Granger + Rust
ATTORNEYS 3,127,703
ADJUSTABLE GUIDE STRIPS OR GROUND MEMBERS
Ronald E. Eshelman, 2138 Ingersoll Drive, Akron 20, Ohio
Filed May 24, 1962, Ser. No. 197,493
5 Claims. (Cl. 50—322)

The invention relates in general to guide strips or ground members used in building construction which can be adjusted to desired positions to receive flowable material therebetween so as to produce a perfectly flat, plumb, or level surface.

An object of the present invention is to provide a means for producing a flat surface.

Another object of the present invention is to provide adjustable guide strips for attachment to a conventional back up wall such as a ceiling, floor or vertical wall to serve as guides for flowable or trowelable material such as gypsum or cement plaster to assure a true level plane area which is to receive a final finish for example of paint, tile, paper, etc.

Another object of the present invention is to provide an assembly which can be attached to a subwall which is not in a true plane or not in the desired plane and which can be adjusted to provide guide surfaces between which flowable material can be placed and struck off by means of a board or or other straight edge to produce a surface of the flowable material located in substantially the same plane as the guide surfaces.

Another object of the present invention is to provide an adjustable ground assembly which includes a mounting plate adapted to be secured to a wall and a ground member with screw members extending between the plate and member whereby the ground member may be adjusted relative to the mounting plate.

Another object of the present invention is to provide an adjustable ground assembly which includes a mounting plate with a plurality of mounting studs which threadably secure adjusting screws, the other ends of which include head portions which are connected to a ground or guide member and upon rotation of said screws selected portions of the plate and member can be adjusted relative to each other.

Another object of the present invention is to provide an adjustable ground assembly which includes an adjustment member as well as a ground or guide member with a means of connecting two together whereby the adjustment member can be moved out of a position generally normal to the ground member.

Other objects and a fuller understanding of this invention may be had by referring to the following description and claims, taken in conjunction with the accompanying drawings, in which:

FIGURE 1 is a front elevational view of a cement block wall showing the adjustable guide strips or ground members attached thereto;

FIGURE 2 is an end view of the wall and guide strips shown in FIGURE 1 and showing the wall as being out of plumb;

FIGURE 3 is an enlarged view taken generally along the line 3—3 of FIGURE 1;

FIGURE 4 is an enlarged view of a portion of one of the guide strips shown in FIGURE 2 and showing the strip and mounting plate generally parallel; and FIGURE 5 is a view similar to FIGURE 4 but showing the strip and mounting plate adjusted or out of parallelism as illustrated in FIGURE 2.

FIGURES 1 and 2 illustrate the guide strips of the present invention associated with a vertically extending cement block wall in such a manner as to receive flowable material such as cement plaster on a surface thereof with the main surface of the cement block wall being out of the vertical and with the finished cement plaster surface produced by the teachings of the present invention lying substantially in the desired vertical plane. It will be appreciated by those skilled in the art that the guide strips or ground members of the present invention may be used with many conventional construction back up walls such as ceilings, sub floors and the like, and these back up walls may be of cement block, stucco, brick, hollow tile, metal lath, gypsum lath, wood lath, wood or metal studs, wood or concrete floors and of many other conventional construction materials. It will be appreciated that the invention is not only for bringing a surface into a true vertical or horizontal plane, but to bring a surface into a desired plane whereas the original surface was too much at variance to be acceptable from a practical standpoint.

In the illustrated embodiment shown in FIGURES 1 through 5, the conventional cement block wall has been illustrated by the reference numeral 10 and as shown particularly in FIGURE 2, this cement block wall has been shown to be at variance with a plumb line or a vertical plane within which it be desired that it reside. Two adjustable ground assemblies of the present invention, both illustrated generally by the reference numeral 12, are secured to the cement block wall 10 and cooperate together to assure that the plaster in this particular instance, for the sake of illustration, which is applied to the face of the cement block wall will lie in a substantially true vertical plane. Since each of the adjustable ground assemblies 12 are constructed in the same manner, the construction of only one will be described in detail. The adjustable ground assemblies each comprise in combination a mounting plate 14 and what is referred to as a ground member or guide strip 16. The mounting plate 14 comprises a generally flat elongated member which has a plurality of openings 18 extending generally along the opposite edges thereof and these openings serve to receive nails 19 which secure the mounting plate in a generally flatwise relationship to the cement block wall 10. Wall means 20 define a plurality of mounting studs which are spaced lengthwise along and which are secured to the mounting plate 14. Each of these mounting studs 20 have a threaded opening 22 extending generally normal to the extent of the mounting plate 14.

The ground member or guide strip referred to above is provided with first and second side portions 25 and 26 respectively and as will be noted from FIGURE 4, this ground member in cross section is generally channel or U-shaped and the first side portion 25 of the bottom of the channel or U-shape is slightly dished as indicated at 28 for a purpose which will be described. Wall means 30 define a plurality of openings extending through the ground member at intervals. These intervals are substantially equal to the placement of the mounting studs 20. FIGURES 3 through 5 illustrate in detail one of the openings 30.

Adjusting screws or members 32 are provided for moving the ground member relative to the mounting plate and each of the adjusting screws is provided with first and second end portions 35 and 36 respectively. The second end portion 36 of the adjusting screws are each provided with threads which threadably reside in a corresponding threaded opening 22 in a mounting stud 20. The first end portion 35 of each of the adjusting screws comprises a head portion with a curved under portion 38 and this curved under portion generally corresponds to a curved portion 40 on the first side portion 25 of the ground member 16. Wall means 44 serve to define a shoulder on each of the adjusting screws spaced from the head portions a distance slightly greater than a thickness of the ground member and located adjacent the second side portion of the ground member. It will be noted that the head portions and the shoulders are larger than the openings 30 in the ground member, thus securing the adjusting screws to the ground member. The assembling of the adjusting screws to the ground members, although not forming a principal part of the present invention, is accomplished by originally providing the adjusting screws with a shank which will extend through the openings 30 and thereafter distorting the upper portion of this shank to form the head portions as shown.

It will be noted that the head portions of the adjusting screws are provided with a V-shaped wall 46 which will receive a screw driver to enable the adjusting screws to be moved in and out of the threaded opening in the mounting studs 20. It will also be noted that the means of connecting the first end portion 35 of the adjusting screws to the ground members enables the ground members and adjusting screws to be moved out of a position of perpendicular relationship with each other.

As a result, in order to utilize the adjustable ground assemblies 12 as illustrated in the drawings, it is first necessary to secure them to the cement block wall by means of the nails 19 through the openings 18 in the mounting plates 14. When this has been accomplished, the adjusting screws 32 are turned, in this particular instance, so as to bring the top part of the ground members out of their mounting studs a shorter distance than the corresponding bottom ones. The vertical position of the ground members can be determined by the conventional level. After this has been accomplished, plaster 50 is applied between the adjustable ground assemblies and can be screeded to a flat condition corresponding to the outer surface of the ground member 16 by means of a board 51 as shown or any other suitable straight edge. The head portions of the adjusting screws 32 are covered because they reside in the dished portion 28 of the ground members.

It will therefore be seen that in accordance with the teachings of the present invention a convenient means has been provided for producing a flat plane surface for receiving a final conventional finish coating of any kind such as paint, floor tile or the like. The guide strips or ground members may be used with conventional back up walls and may be conveniently adjusted to a desired plane and these strips then serve to determine the position of flowable or trowelable material such as plaster which is used in producing the surface.

Although this invention has been described in its preferred form with a certain degree of particularity, it is understood that the present disclosur of the preferred form has been made only by way of example and that numerous changes in the details of construction and the combination and arrangement of parts may be resorted to without departing from the spirit and the scope of the invention as hereinafter claimed.

What is claimed is:

1. An adjustable ground assembly for a building wall construction including in combination at least two mounting plates and ground members, each said mounting plate comprising a generally flat elongated member having a plurality of openings therethrough, said openings being adapted to receive nails to secure said mounting plate in a generally flatwise relationship to a building wall, wall means defining a plurality of mounting studs spaced lengthwise along and secured to said mounting plate, each of said mounting studs having a threaded opening extending generally normal to the extent of said mounting plate, each said ground member having first and second side portions and in cross section being generally channel shaped with said first side of the bottom of the channel shape being slightly dished, wall means defining a plurality of openings extending through said ground member at intervals substantially equal to the placement of said mounting studs, adjusting screws each having first and second end portions, said second end portion of each said adjusting screw threadably residing in a corresponding threaded opening in a mounting stud, said first end portion of each said adjusting screw comprising a head portion with a curved under portion mating with a corresponding curved portion of said first side portion of said ground member, wall means defining a shoulder on each of said adjusting screws spaced from said head portions and located adjacent said second side portion of said ground member, said head portions and said shoulders being larger than said openings in said ground member thus securing said adjusting screws thereto, said head portions of said adjusting screws being capable of being turned by a tool to locate said ground member out of parallelism with said mounting plate.

2. An adjustable ground assembly for a building wall construction including in combination a mounting plate and a ground member, said mounting plate comprising an elongated member having a plurality of openings therethrough, said openings being adapted to receive members to secure said mounting plate to a building wall, wall means defining a plurality of mounting studs spaced lengthwise along and secured to said mounting plate, each of said mounting studs having a threaded opening extending generally normal to the extent of said mounting plate, said ground member having first and second side portions and in cross section being generally channel shaped, wall means defining a plurality of openings extending through said ground member at intervals substantially equal to the placement of said mounting studs, adjusting screws each having first and second end portions, said second end portion of each adjusting screw threadably residing in a corresponding threaded opening in a mounting stud, said first end portion of said adjusting screw comprising a head portion, wall means defining a shoulder on each of said adjusting screws spaced from said head portions and located adjacent said second side portion of said ground member, said head portions and said shoulders being larger than said openings in said ground member thus securing said adjusting screws thereto, said head portions of said adjusting screws being capable of being turned by a tool to locate said ground member out of parallelism with said mounting plate.

3. An adjustable ground assembly for a building wall construction including in combination a mounting plate and a ground member, said mounting plate having a plurality of openings therethrough, said openings being adapted to receive members to secure said mounting plate to a wall, wall means defining a plurality of mounts spaced lengthwise along and secured to said mounting plate, each of said mounts having a threaded opening, said ground member being generally U-shaped, wall means defining a plurality of openings extending through said ground member at intervals substantially equal to the placement of said mounts, adjusting screws each having first and second end portions, said second end portion of each adjusting screw threadably residing in a corresponding threaded opening in a mount, said first end portion of said adjusting screw comprising a head portion carried by said ground member, said head portions of said adjusting screws being capable of being turned to move selected portions of said ground member relative to said mounting plate.

4. An adjustable ground assembly for a building wall construction including in combination, mounting plate means and a ground member, said mounting plate means having a plurality of openings therethrough, said openings being adapted to receive members to secure said mounting plate means to a wall, said mounting plate means having a plurality of adjusting screw receiving openings therein, said ground member being generally U-shaped, wall means defining a plurality of openings extending through said ground member at intervals substantially equal to the placement of said adjusting screw receiving openings, adjusting screws each having first and second end portions, said second end portion of each adjusting screw residing in a corresponding adjusting screw receiving opening in said mounting plate means, said first end portion of said adjusting screw comprising a head portion captively carried by said openings in said ground member, said head portions of said adjusting screws being capable of being turned to move selected portions of said ground member relative to said mounting plate means.

5. An adjustable ground assembly for a building wall construction including in combination, mounting plate means and a ground member, said mounting plate means having means to secure same to a wall, said mounting plate means having a plurality of adjusting screw receiving openings therein, wall means defining a plurality of openings extending through said ground members at intervals substantially equal to the placement of said adjusting screw receiving openings, adjusting screws each having first and second end portions, said second end portion of each adjusting screw residing in a corresponding adjusting screw receiving opening in said mounting plate means, said first end portion of said adjusting screw comprising a head portion captively carried by said openings in said ground member, said head portions of said adjusting screws being capable of being turned to move selected portions of said ground member relative to said mounting plate means.

References Cited in the file of this patent

UNITED STATES PATENTS

| | | |
|---|---|---|
| 2,236,850 | Hansman | Apr. 1, 1941 |
| 2,552,004 | Erdman | May 8, 1951 |

FOREIGN PATENTS

| | | |
|---|---|---|
| 528,055 | Canada | July 24, 1956 |
| 1,232,932 | France | May 2, 1960 |
| 302,847 | Switzerland | Jan. 17, 1955 |